United States Patent
Barsukova et al.

(10) Patent No.: US 10,248,714 B2
(45) Date of Patent: Apr. 2, 2019

(54) PROTECTING DOMAIN-SPECIFIC LANGUAGE OF A DIALOGUE SERVICE

(71) Applicant: International Business Machines Corporation, Armonk, NY (US)

(72) Inventors: Agnia Barsukova, Mulhuddart (IE); David M. Curran, Dublin (IE); Scott P. Joynt, Columbus, OH (US); Simon P. O'Doherty, Dublin (IE)

(73) Assignee: International Business Machines Corporation, Armonk, NY (US)

(*) Notice: Subject to any disclaimer, the term of this patent is extended or adjusted under 35 U.S.C. 154(b) by 372 days.

(21) Appl. No.: 14/956,867

(22) Filed: Dec. 2, 2015

(65) Prior Publication Data
US 2017/0161360 A1    Jun. 8, 2017

(51) Int. Cl.
  *G06F 17/30* (2006.01)
  *G06F 21/62* (2013.01)
(52) U.S. Cl.
  CPC .. *G06F 17/30654* (2013.01); *G06F 17/30684* (2013.01); *G06F 21/6245* (2013.01)

(58) Field of Classification Search
  None
  See application file for complete search history.

(56) References Cited

U.S. PATENT DOCUMENTS

| | | | | |
|---|---|---|---|---|
| 2009/0204576 A1* | 8/2009 | Kolz | ............... | G06F 17/30734 |
| 2014/0040945 A1* | 2/2014 | Gates, III | ............ | H04N 21/435 |
| | | | | 725/34 |
| 2014/0089507 A1* | 3/2014 | Prakash | ........... | H04N 21/44008 |
| | | | | 709/225 |

OTHER PUBLICATIONS

Jing Bai, Jian-Yun Nie. Adapting Information Retreival to Query Contexts. May 2008. Informaiton Processing and Management 44. pp. 1901-1922.*

* cited by examiner

*Primary Examiner* — Tuankhanh D Phan
(74) *Attorney, Agent, or Firm* — Terrile, Cannatti & Chambers, LLP; Stephen A. Terrile

(57) ABSTRACT

Concepts for protecting domain-specific language of a dialogue service are presented. The presence of a protected term in a domain-specific query may be identified based on the domain that is specific to the query. The identified protected term may then be substituted with an associated substitute term.

15 Claims, 6 Drawing Sheets

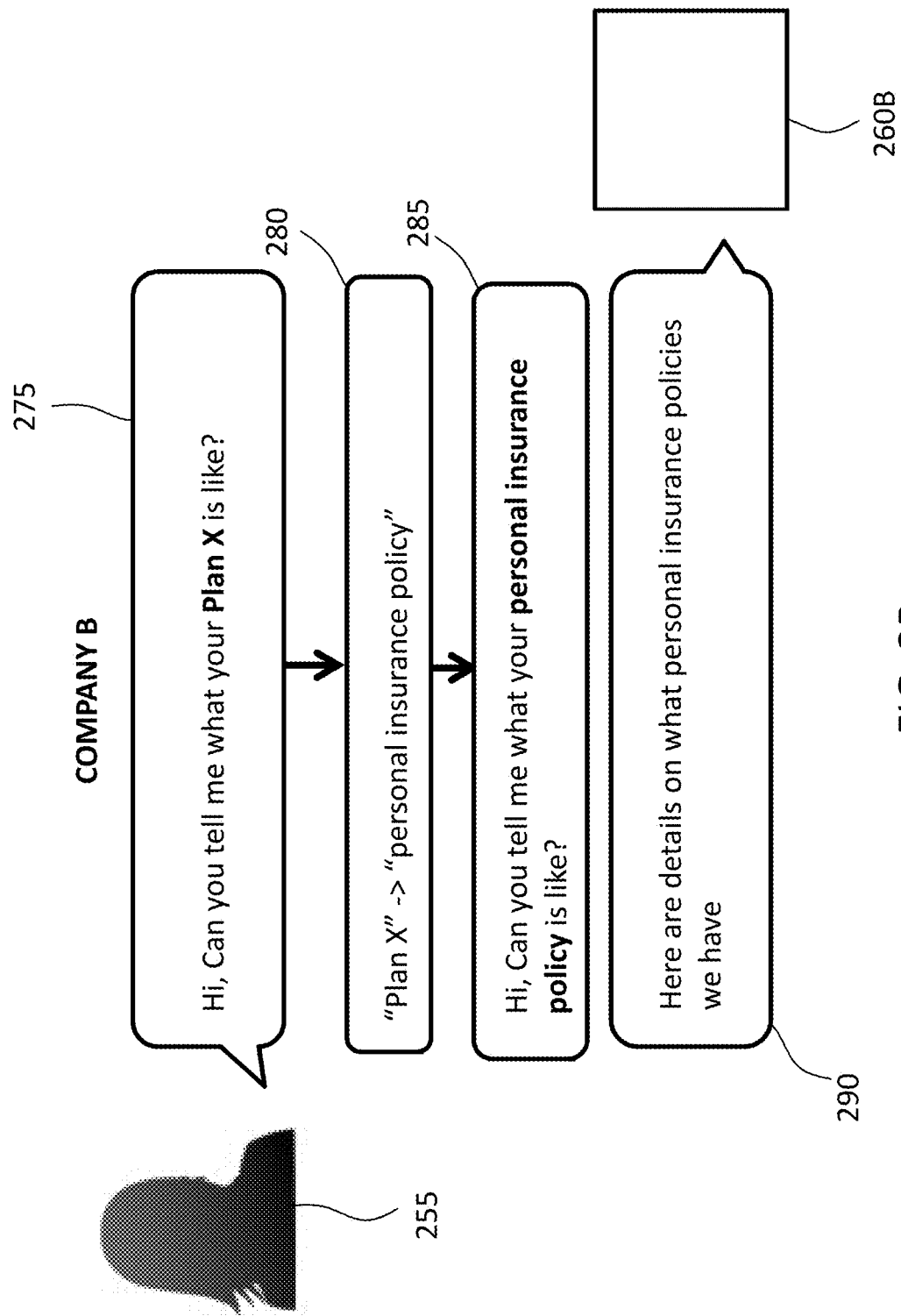

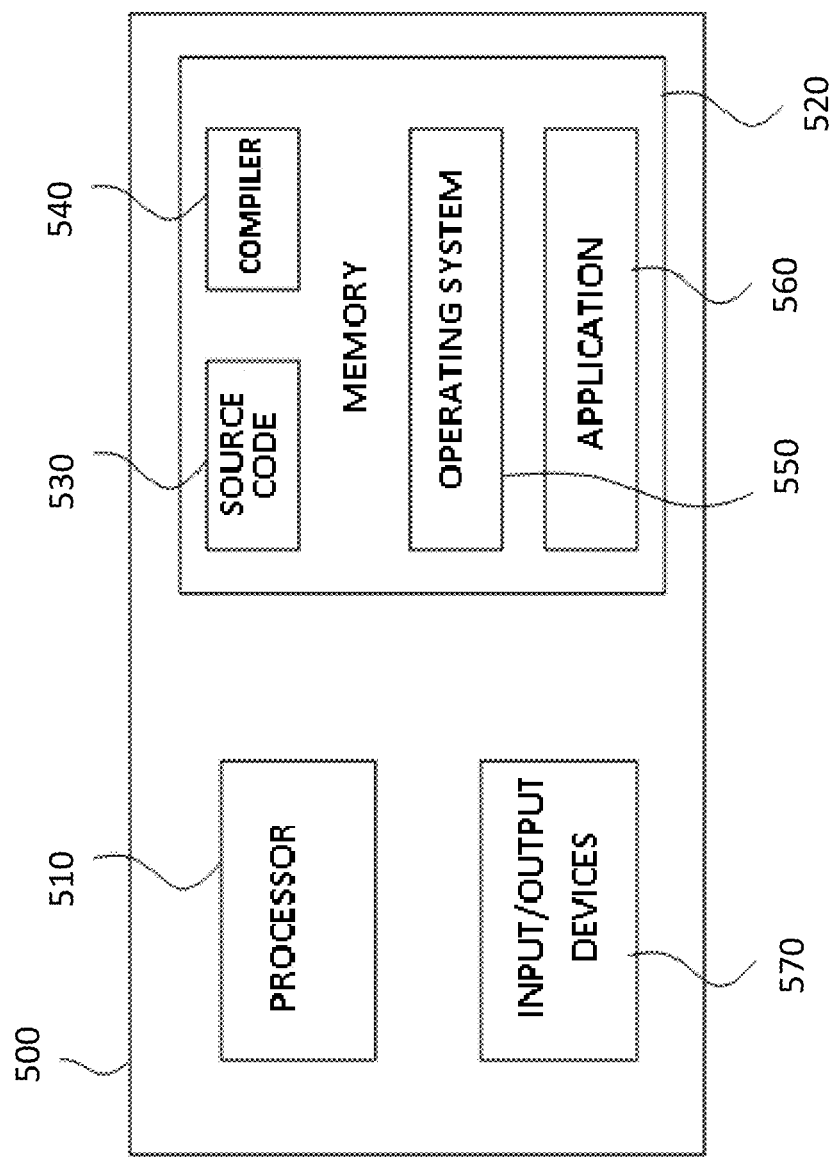

PROTECTING DOMAIN-SPECIFIC LANGUAGE OF A DIALOGUE SERVICE

BACKGROUND

The present invention relates to the field of information retrieval systems, and more particularly to dialogue services that enable user interaction with information retrieval systems.

Information retrieval systems are typically implemented to provide information in response to a request. An example of an information retrieval system is a Question-Answering (QA) system. QA systems retrieve or construct answers to queries using a collection of documents or information (such as the World Wide Web).

It is fairly typical for queries to be posed in natural language, and so complex Natural Language Processing (NLP) techniques can be needed in order to correctly handle such queries.

Dialogue Services (such as virtual agents) have been devised to understand, diagnose and solve queries, and so they are typically implemented in conjunction with QA systems (and other forms of information retrieval systems). Such dialogue services may be tailored to particular (knowledge) domains or instances of an information retrieval system in an attempt to improve handling (e.g. improve understanding, diagnosis, and/or solving) of queries.

Where a particular version of an information retrieval system is created for a particular customer or user, that version is typically referred to as an "instance." An instance of an information retrieval system may therefore comprise an associated dialogue service (which may be specifically tailored to the instance).

For each instance or dialogue service within a knowledge domain, some of the corpus/language knowledge may be considered sensitive or protected, although common terms may be shared with other instances.

For example, a customer/user for an instance created for Company A might always refer to personal insurance as "Plan X." Thus, if the customer/user talks to (e.g. queries) another instance which has been created for a different company (Company B, for example) mentioning Plan X may raise some issues. By way of example, the instance for Company B may have no context for Plan X, or an incorrect context. The instance for Company B may therefore provide an incorrect answer (or no answer at all).

In addition, Company B may be able to determine that the customer/user is using a context that is associated with a competitor (due to using terms related to Company A for example). Company A may not wish for this to happen. Furthermore, the customer/user may also be unaware that they are indicating such information.

Further, even if the context is not personal, Company B would need to have their dialogue service adapted to understand the context, and Company B may not be able to keep up with a competitor's terms as they change, nor would they normally want to.

Also, Plan X may, for example, be an internal plan that should not be divulged outside of that domain. The user may for instance be an employee for Company A and not realize they should not discuss it.

Such exemplary issues become further compounded when a dialogue service is integrated to a cognitive system, as the leaking of information may become easier because, for example, a person may talk to the instance to get it to respond in terms that may be confidential, sensitive, or imply additional information.

Accordingly, a problem faced is how to protect domain-specific language in information systems that use dialogue services.

SUMMARY

According to an embodiment of the present invention, there is provided a system to protect domain-specific language of a dialogue service having a set of protected terms, each protected term being associated with a domain and a substitute term, wherein the system comprises: a query processing unit adapted to identify the presence of a protected term in a received domain-specific query based on the domain that is specific to the query; and a language substitution unit adapted to substitute the identified protected term with its associated substitute term.

According to another embodiment of the present invention, there is provided a computer-implemented method of protecting domain-specific language of a dialogue service having a set of protected terms, each protected term being associated with a domain and a substitute term, wherein the method comprises: identifying the presence of a protected term in a received domain-specific query based on the domain that is specific to the query; and substituting the identified protected term with its associated substitute term.

According to another embodiment of the present invention, there is provided a computer program product for protecting domain-specific language of a dialogue service having a set of protected terms, each protected term being associated with a domain and a substitute term, the computer program product comprising a computer readable storage medium having program instructions embodied therewith, the program instructions executable by a processing unit to cause the processing unit to perform a method comprising: identifying the presence of a protected term in a received domain-specific query based on the domain that is specific to the query; and substituting the identified protected term with its associated substitute term.

BRIEF DESCRIPTION OF THE DRAWINGS

Preferred embodiments of the present invention will now be described, by way of example only, with reference to the following drawings, in which:

FIG. 3B illustrates part of a conversation between a user and a dialogue service of Company B according to an embodiment;

FIG. 5 illustrates an example of a computer within which one or more parts of an embodiment may be employed.

DETAILED DESCRIPTION

Figure 1:
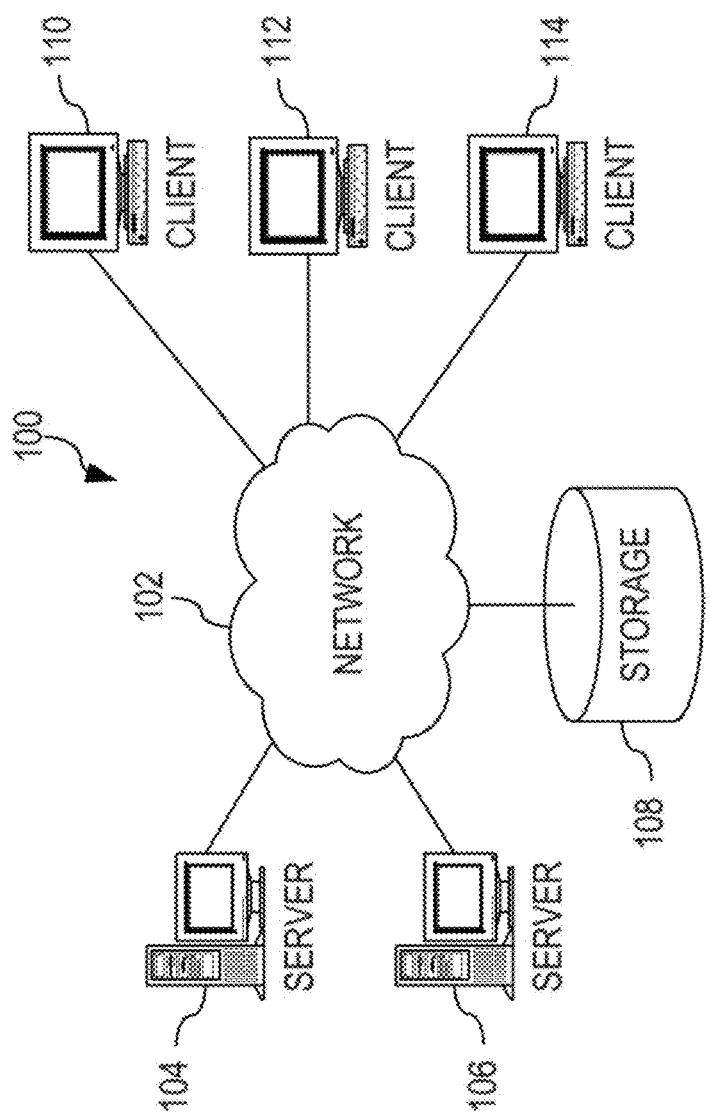
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

Proposed is a concept of protecting domain-specific language in information systems that use dialogue services. In particular, it is proposed to employ a set of protected terms which can be scanned for in a query, conversation or corpus. Protected terms that are found may then be replaced, with a predetermined "safe" replacement term for example, before the query, conversation or corpus. By replacing protected terms with other, more generic terms, a query, conversation or corpus may be edited so as to no longer contain protected terms before being passed to a new instance or different dialogue service for example.

Embodiments may therefore enable a user to interact with a dialogue service using natural language and/or terms that may actually be inappropriate for use with the dialogue service. Protected (e.g. inappropriate, sensitive, secret, etc.) terms may be replaced in an invisible manner so that user interaction with an embodiment remains unaffected or transparent from the perspective of the user.

Furthermore, a response generated by a dialogue server may be generated such that protected terms (that the response would otherwise normally contain) are replaced with substitute terms. In this way, a user receiving such a response may be subtlety trained to use the substitute term(s) instead of the protected term(s).

In some embodiments, substitution of protected terms may take account of situations where duplicate domain terms have different meanings, thus enabling the most appropriate or correct substitute term to be selected and used. Thus, a protected term may be associated with a plurality of substitute terms, and embodiment may be adapted to select one of the plurality of substitute terms associated with a protected term based on a context of the identified protected term and/or the query, for example.

Thus, rather than exposing protected terms of queries to a different dialogue service or instance, embodiments may instead identify protected terms (using a stored dictionary of protected terms for example) and substitute the protected terms so that they are not exposed to a particular dialogue service of a different customer for example.

Embodiments may employ a database (e.g. dictionary) of protected terms and their associated substitutes to identify and replace protected terms within an information retrieval system query. This may be thought of a making use of: (i) query processing to identify the presence of a protected term in a domain-specific query; and (ii) language substitution unit to replace an identified protected term with an associated substitute term.

Proposed embodiments may make use of a data storage unit to store data representative of a set of protected terms as well as the domain and substitute term associated with each protected term. A dictionary of protected terms may therefore be maintained as part of an embodiment, and the dictionary of protected terms may be altered, modified or changed according to requirements. This may be done by a user and/or an automated system/computer (such a system according to an embodiment for example). For example, a stored dictionary may be trained (e.g. updated or modified) to include new or different protected terms based on previously received queries. Such previously received queries may have been obtained from the same user, thus potentially enabling a dictionary to be adapted to be user-specific.

Illustrative embodiments may therefore provide concepts for substituting protected terms in information retrieval queries in order to prevent the protected terms from being exposed to different instances and/or dialogue services.

Put another way, there is proposed a concept of replacing protected terms in natural language queries so that preferred safe or generic terms are presented for subsequent processing by different instance or dialogue services. The protected terms may be identified by referring a set (e.g. dictionary) of protected terms. The set may provide information about one or more substitute terms for each protected term. Thus, proposed concepts may employ a concept of substituting protected terms so as to prevent their unwanted exposure.

Figure 2:
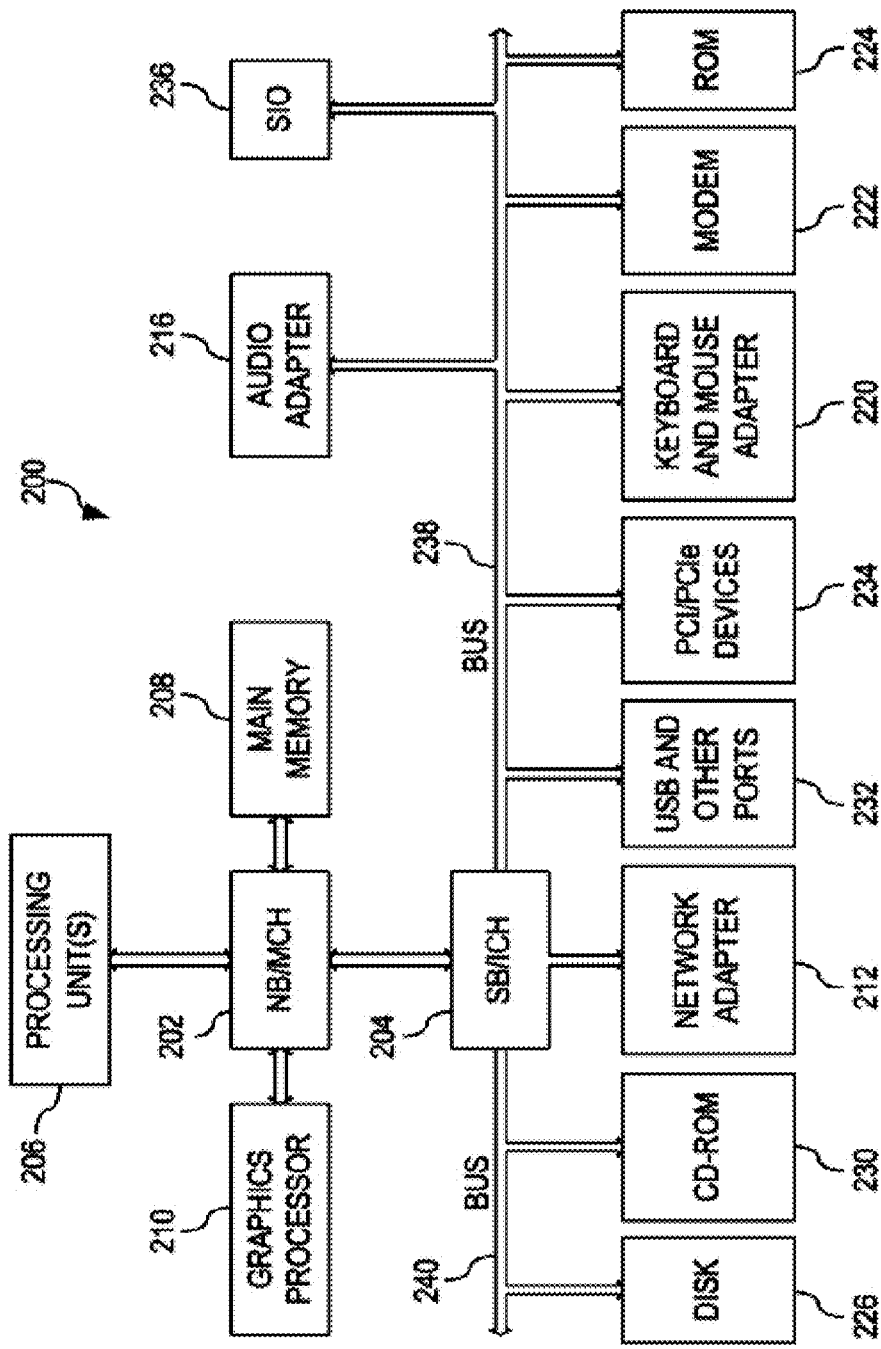
FIG. 2 is a block diagram of an example data processing system in which aspects of the illustrative embodiments may be implemented.

Illustrative embodiments may be utilized in many different types of data processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed prediction system in which aspects of the illustrative embodiments may be implemented. Distributed language protection system 100 may include a network of computers in which aspects of the illustrative embodiments may be implemented. The distributed language protection system 100 contains at least one network 102, which is the medium used to provide communication links between various devices and computers connected together within distributed language protection system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed prediction system 100 may include additional servers, clients, and other devices not shown.

In the depicted example, the distributed language protection system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system 200 in which aspects of the illustrative embodiments may be implemented. The data processing system 200 is an example of a computer, such as client 110 in FIG. 1, in which computer usable code or instructions implementing the processes for illustrative embodiments of the present invention may be located.

In the depicted example, the data processing system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on the processing unit 206. The operating system coordinates and provides control of various components within the data processing system 200 in FIG. 2. As a client, the operating system may be a commercially available operating system. An object-oriented programming system, such as the Java™ programming system, may run in conjunction with the operating system and provides calls to the operating system from Java™ programs or applications executing on data processing system 200. Java and all Java-based trademarks and logos are trademarks or registered trademarks of Oracle and/or its affiliates.

As a server, prediction system 200 may be, for example, an IBM® eServer™ System p computer system, running the Advanced Interactive Executive (AIX®) operating system or the LINUX® operating system. The data processing system 200 may be a symmetric multiprocessor (SMP) system including a plurality of processors in processing unit 206. Alternatively, a single processor system may be employed. Linux is a registered trademark of Linus Torvalds in the United States, other countries, or both. IBM, eServer and AIX are trademarks or registered trademarks of International Business Machines Corp., registered in many jurisdictions worldwide.

Instructions for the operating system, the object-oriented programming system, and applications or programs are located on storage devices, such as HDD 226, and may be loaded into main memory 208 for execution by processing unit 206. Similarly, one or data structures according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as first bus 238 or second bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, the prediction system 200 may be a portable computing device that is configured with flash memory to provide non-volatile memory for storing operating system files and/or user-generated data, for example. Thus, the data processing system 200 may essentially be any known or later-developed data processing system without architectural limitation.

A proposed concept may enhance an information retrieval system/method by providing for domain-specific language of a dialogue service to be protected. Embodiments may enable the predetermined protected language terms or expressions to be substituted before be presented to other instances of information retrieval systems/methods or other dialogue services. Users may therefore be empowered to use natural language without being concerned about exposing sensitive information to other entities. Also, by generating responses that had their protected language terms or expressions substituted with replacement, safe terms/expressions, users may be trained so as to avoid using protected language terms or expressions in future queries or conversations.

Figure 3A:
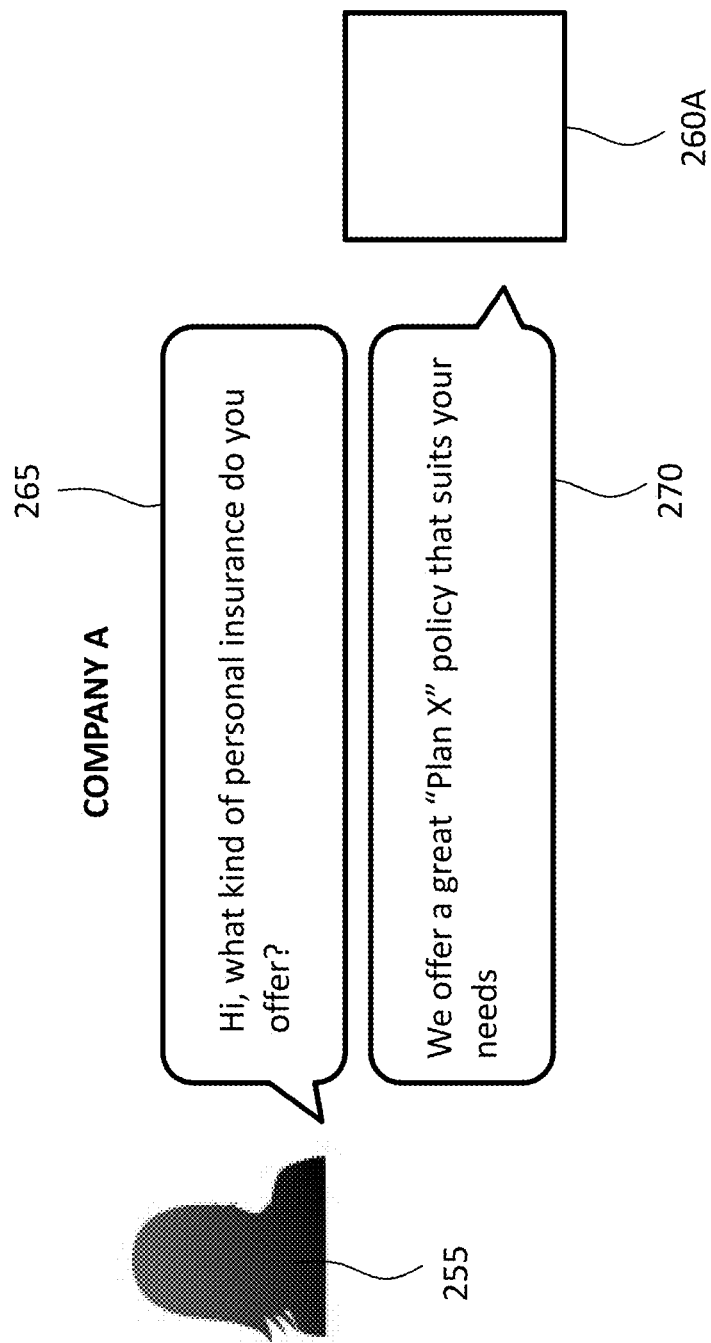
FIG. 3A illustrates part of a conversation between a user and a dialogue service of Company A.

With reference to FIG. 3A, part of a conversation between a user 255 and a dialogue service 260A of Company A is illustrated. The user 255 may query 265 (e.g. ask) the dialogue service 260A about the different personal insurance policies provided by Company A. The dialogue service 260A may reply 270 by stating that a suitable or recommended policy is "Plan X." Subsequently, the user 255 may have a long discussion with the dialogue service 260A regarding "Plan X." As a result, the user 255 may start to refer to the generic expression personal insurance as Plan X (instead of personal insurance). Company A may, however, not want this term to be generalized in such a fashion.

Thus, according to an embodiment, the term "Plan X" may be designated as a protected term within a private dictionary of protected terms. This dictionary may be encrypted one way, and may also contain details regarding where the source term came from (as well as domain references and other knowledge graph information). As a result, if a user says or uses the same term outside of the domain (e.g. personal insurance) it may not be changed.

However, if used in the domain (e.g. personal insurance) the term may be identified as a protected term and substituted.

By way of example only, an entry in the dictionary may be represented in a Table like Table 1 below.

TABLE 1

| Plan X | Replace With: | "personal insurance policy" |
|---|---|---|
| | Domain: | Insurance |
| | Source Term | "personal insurance" |
| | Domain Owner | URI://CompanyA |
| | Reverse Translate | No |
| | Alternate Terms | PlanX, PlanX, Plan X, policy X |
| | Part of Speech | Noun |

According to an embodiment, the user may talk to a different instance (e.g. dialogue service of Company B, which is also an insurance company). Due to their long conversation with Company A, they may now generalize "Plan X" in their vocabulary when they should instead use the term "personal insurance policy."

With reference to FIG. 3A, an exemplary part of a conversation between the user 255 and a dialogue service 260B of Company B is illustrated. The user 255 may query 275 (e.g. ask) the dialogue service 260B about Policy X, even though Company B does not refer to their policies in the same way (let alone have a Policy X). The query may be intercepted and processed 280 to identify the presence of the protected term "Policy X" within the query. This may, for example, be done comparing each term of the query with entries (such as Table 1) of the dictionary. If the protected term matches that of an entry of the dictionary, the associated domain of the query may be checked against the domain detailed in the dictionary entry. Where the associated domain detailed in the dictionary entry matches that of the query, the term of the query is identified as being protected and replaced with a substitute term detailed in the dictionary entry. In this example, the term Plan X is identified as being a protected term and replaced with the associated substitute term "personal insurance policy."

As a result, a replacement query 285 may be generated for presentation to the dialogue service 260B of Company B. In this way, the replacement query 285 may not contain any reference to a "Policy X." The dialogue service 260B may then process the query 285 in its normal manner and generate a response regarding the personal insurance policies provided by Company B.

The embodiment may also reverse translate, or translate back to a different term. As this translation takes place in context of the conversation, it may make it harder to decode protected terms without also intercepting related conversations. Also, embodiments may be able to disambiguate where the term has multiple meanings, or where there may be a deadlock of context.

Initial Setup:

An instance owner can create a dictionary of protected terms either manually, or, at corpus ingestion time, the instance can review each document and when building context also map the context to other key terms within the document. So, for example, if a document (either by meta-data or unstructured data) makes references to the confidentially of a term, it may then map definition terms to it and other context data (e.g. domain, Part of Speech, etc). It may also store alternate variations of the terms, or common misspellings. Product taxonomies can also be used to help semi-automate/speed up this process.

Also, each instance may have a unique instance OwnerID associated with each term.

Each term may also have a scoring system associated with it. A term may be scored based on number of times it is returned (in dialogue and/or in document, for example), how often the client uses the term, and with what instances. This may build the confidence of what the user believes the term to mean. For example, a user typing the term would score higher than the term appearing in a document. Likewise, the use of the term across multiple instance responses may score higher than just multiple references in one document/response.

There may be many terms that fall into the Protected Domain Terms (PDTs) but a user may never see this. However, this may not be an issue, as the user never has such a discussion on this topic, and thus they can't use in the context of data they are not aware of.

Conversation:

Starting from Scratch:

The instance may work as a normal dialogue/Q&A service. As the instance returns back information, it also passes back a list or set of PDTs to the client's Dialogue Service (DS). The protected terms may be encoded with a one-way encryption, and the rest of the meta-data may therefore be readable by the client. These protected terms may then be stored in a dictionary (or an Unstructured Information Management Architecture, UIMA, which is a standard framework for building dictionaries which can be used to parse unstructured data into a fixed structure). The instance may also send back multiple variations of the same protected term, where a variation may depend on the domain used.

Initiating a Later Conversation:

As the user writes each sentence or query, it is broken up into its related Part of Speech (POS) tagging using UIMA. Each related entity may be given a one way encryption (hashing), then looked up in the PDT dictionary. A list of terms for each POS is generated. Where exact matching may not be required, a bloom filter may be used to determine the existence of a protected term.

For each part of speech where PDT references are found:

(i) It is checked if it maps to the related domain. If not, it may be dropped. The related domain can be the one specified by the instances knowledge (insurance, medical, IT, etc.). It may also relate to the domain term in relation to the conversation piece given. Example: "I bought a boat called Planx, can I insure it?" In this case the NLP will pick up that it is referring to the boat, and not to a PDT.

(ii) It is checked if there are multiple references from different instances. If so, then the scoring may come into play as to determining what the user may be talking about. This may be a weighted system with a threshold to the highest scored term (which can be defined by the client). Further scoring adjustments may be based on the both instance's replacement terms and how closely they are related to each other. By way of illustration, an example may be as follows:

Scores: Instance A=100, Instance B=90. If the client is talking to Instance B, it would skip replacing the term as it believes the user is talking about the correct term.

Scores: Instance A=100, Instance B=10. If the client is talking to Instance B, it would replace the term based on Instance A as it believes the user is more familiar with this term. However, if the terms from both instances didn't share a common entity relationship (e.g. "personal insurance" vs. "3rd party insurance") then the scoring may be changed to favor instance B. Likewise is may depend on the POS attribute (e.g. Noun vs. Verb expected).

To explain further, the 90 means here that the term had a high relationship to the context of information known by B. It also has a high relationship to A, but as the client is talking to B, that is what matters. In B=10, it doesn't have a close relationship to the context of known information, so it falls back to A to look for a relative term, based on the concept being discussed.

So as an example:

Tell me about Plan X (context of the dialogue=Home Insurance)

A—Home Insurance=100
B—Home Insurance=90
So it is acceptable to use the term.
If the context is Car Insurance
A—Car Insurance=100
B—Home Insurance=10
Here one would fall back to the term from A.

Once the actual PDT is determined, the replacement term may be substituted and then the whole sentence may be passed onto the instance for analysis and response generation. Grammatical corrections may take place in the substitution.

The instance will analyze the text and after finding the answer and creating data as detailed in Initial setup, it may also map any potential source terms that were used to find the information. Where a PDT term is returned, it may (depending on instance/client) change the PDT term to the original "source term." For example, this may comprise the original text the user wrote to initially map to that term.

(iii) The system may also analyze dialogue conversation where the user is trying to correct an earlier question which may be wrong due to a PDT change. In such cases it may adjust the scores of the terms to match this.

(iv) The system may also contain an attribute to friendly systems. These are systems outside of the domain language, but share a common factor. For example, an HR Instance, IT instance and Insurance instance may all belong to the same company. In this case the PDTs may be shared.

Figure 4:
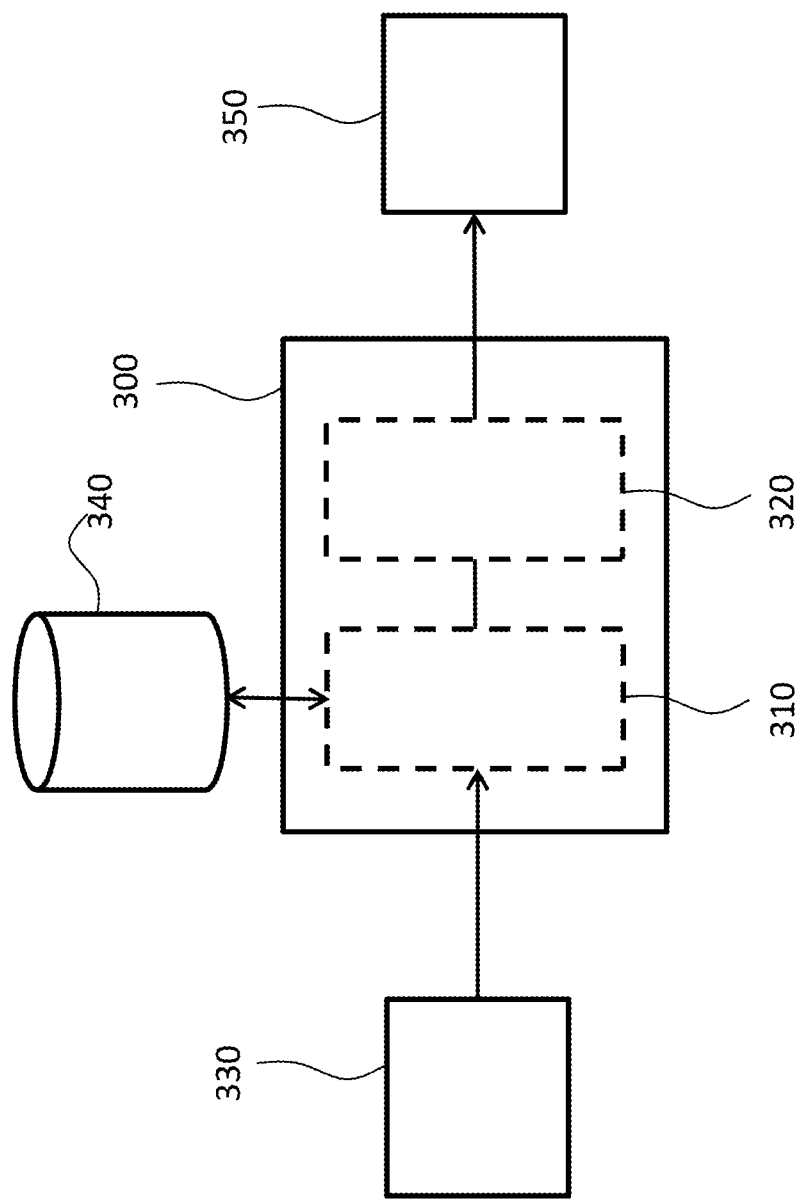
FIG. 4 is a schematic block diagram of a system for protecting domain-specific language of a dialogue service according to an embodiment.

With reference to FIG. 4, a system 300 for protecting domain-specific language of a dialogue service may comprise a query processing unit 310 and a language substitution unit 320.

In this embodiment, the query processing unit 310 may process user queries provided via an input interface 330 so as to identify the presence of a protected term in a query. Here, the queries are assumed to be domain-specific so that they relate to a particular knowledge domain (such as the domain of insurance policies, technology, sport, medicine, etc. for example). The query processing unit 310 accesses a data storage unit 340 (e.g. data storage device or database) which stores information (e.g. a dictionary) relating to a set of protected terms, wherein each protected term is associated with a domain, a substitute term, and context information. By checking each term of the query against information stored in the data storage unit 340, the query processing unit 310 identifies whether or not each term is protected.

By way of example, the query processing unit 310 may determine if a term of the query has an entry defined in the information (e.g. dictionary) stored by the data storage unit 340. If the term is in the information (e.g. dictionary) stored by the data storage unit 340, the query processing unit 310 may determine if the context and domain of the query and/or the term matches that which is associated with the term in the information (e.g. dictionary) stored by the data storage unit 340. If the context and domain match that of the information (e.g. dictionary), the term is identified by the query processing unit as being a protected term and the query processing unit determines an associated substitute term from the information stored by the data storage unit 340. Thus, it will be understood that the query processing unit 310 may identify the presence of a protected term in a received domain-specific query based on the domain that is specific to the query and further based on context information relating to a context of the query and/or the term of the query.

In this example, information (such a dictionary) about a set of protected terms, and their associated domain(s), context(s), and substitute term(s), is stored in a data store 340 that is accessible by the processing unit 310. In this way, the processing unit 310 may receive or retrieve information about protected terms from the data store, and the processing unit 310 may also transmit or provide information (e.g. for modifying information about protected terms) for storage in the data store 340.

Queries may be provided to the processing unit 310 via the first input interface 330. By way of example, the first input interface 330 for providing a query to the processing unit 310 may comprise an information retrieval interface application implemented on a computer system that has a graphical user interface which is adapted to receive user inputs for defining and/or altering queries.

The language substitution unit 320 may be adapted to receive information about identified protected terms and associated substitute terms from the query processing unit 310. Based on such information, the language substitution unit 320 may substitute an identified protected term with its associated substitute term. In this way, the language substitution unit 320 may be considered to perform the function of a query generating unit since it may be adapted to generate a replacement query for a different dialogue service, wherein the replacement query comprises a substitute term substituted in place of an identified protected term. Alternatively, and/or additionally, the language substitution unit 320 may be considered to perform the function of a response generating unit, since it may be adapted to generate a response to the received domain-specific query, wherein the response comprises a substitute term substituted in place of an identified protected term.

The language substitution unit 320 is adapted to provide its generated output (e.g. a replacement query or a response to query) to an output interface 350 for communication to a user or another system (such as a dialogue service or an instance of an informational retrieval system).

By way of example, the output interface 350 may comprise a display unit adapted to display one or more graphical elements based on information output from the language substitution unit 320. The displayed graphical element(s) may then be viewed by a user.

The example of FIG. 3 may also employ encryption hardware and/or software to secure the information about the set of protected terms. In this way, information about protected terms may be prevented from being exposed to a user and/or differing system without the necessary security credential.

FIG. 5 illustrates an example of a computer 500 within which one or more parts of an embodiment may be employed. Various operations discussed above may utilize the capabilities of the computer 500. For example, one or more parts of a system for converting synchronous operations into asynchronous operations may be incorporated in any element, module, application, and/or component discussed herein.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a microprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 860 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system to protect domain-specific language of a dialogue service having a set of protected terms, each protected term being associated with a domain and a substitute term, wherein the system executes on a data processing system within a distributed prediction system, the distributed prediction comprising a storage unit, the data processing system communicating with the storage unit via a network, the system comprising:
- a query processing unit adapted to identify the presence of a protected term in a received domain-specific query based on the domain that is specific to the query, the domain that is specific to the query corresponding to a particular company, the domain having an associated company dialogue service, the protected term corresponding to a term inappropriate for use with a different dialogue service, the protected term being stored within a table along with information associated with the protected term, the information associated with the term comprising replace with information, domain information, source term information, owner information, reverse translate information, alternate term information and part of speech information; and
- a language substitution unit adapted to substitute the identified protected term with its associated substitute term, the language substitution unit using the information from the table to substitute the identified protection term with its associated substitute term.

2. The system of claim 1, further comprising:
a query generating unit adapted to generate a replacement query for a different dialogue service, wherein the replacement query comprises a substitute term substituted in place of an identified protected term that is associated with the substitute term.

3. The system of claim 1, further comprising:
a response generating unit adapted to generate a response to the received domain-specific query, wherein the response comprises a substitute term substituted in place of an identified protected term that is associated with the substitute term.

4. The system of claim 1, wherein:
the storage unit is adapted to store data representative of the set of protected terms and the domain and substitute term associated with each protected term.

5. The system of claim 1, wherein the query processing unit is further adapted to identify the presence of a protected term in a received domain-specific query further based on context information relating to a context of the query and/or the term of the query.

6. The system of claim 1, wherein the set of protected terms is encrypted, and wherein the system further comprises:
a decryption unit adapted to decrypt the set of protected terms.

7. The system of claim 1, where each protected term is associated with a plurality of substitute terms, and wherein the language substitution unit is further adapted to
select one of the plurality of substitute terms associated with the identified protected term based on a context of at least one of: the identified protected term; and the query.

8. A computer-implemented method of protecting domain-specific language of a dialogue service having a set of protected terms, each protected term being associated with a domain and a substitute term, wherein the method executes on a data processing system within a distributed prediction system, the distributed prediction comprising a storage unit, the data processing system communicating with the storage unit via a network, the method comprising:
identifying the presence of a protected term in a received domain-specific query based on the domain that is specific to the query, the domain that is specific to the query corresponding to a particular company, the domain having an associated company dialogue service, the protected term corresponding to a term inappropriate for use with a different dialogue service, the protected term being stored within a table along with information associated with the protected term, the information associated with the term comprising replace with information, domain information, source term information, owner information, reverse translate information, alternate term information and part of speech information; and
substituting the identified protected term with its associated substitute term, the substituting using the information from the table to substitute the identified protection term with its associated substitute term.

9. The computer-implemented method of claim 8, further comprising:
generating a replacement query for the different dialogue service prior to passing the replacement query to the different dialogue service, wherein the replacement query comprises a substitute term substituted in place of an identified protected term that is associated with the substitute term.

10. The computer-implemented method of claim 8, further comprising:
generating a response to the received domain-specific query, wherein the response comprises a substitute term substituted in place of an identified protected term that is associated with the substitute term.

11. The computer-implemented method of claim 8, further comprising:
storing, in the storage unit, data representative of the set of protected terms and the domain and substitute term associated with each protected term.

12. The computer-implemented method of claim 8, wherein the step of identifying the presence of a protected term in a received domain-specific query is further based on context information relating to a context of the query and/or a term of the query.

13. The computer-implemented method of claim 8, wherein the set of protected terms is encrypted, and wherein the method further comprises decrypting the set of protected terms.

14. The computer-implemented method of claim 8, where each protected term is associated with a plurality of substitute terms, and wherein the step of substituting the identified protected term with its associated substitute term comprises:
selecting one of the plurality of substitute terms associated with the identified protected term based on a context of at least one of: the identified protected term; and the query.

15. A computer program product for protecting domain-specific language of a dialogue service having a set of protected terms, each protected term being associated with a domain and a substitute term, the computer program product comprising a computer readable storage medium having program instructions embodied therewith, the program instructions executable by a processing unit of a data processing system within a distributed prediction system, the distributed prediction comprising a storage unit, the data processing system communicating with the storage unit via a network, the program instructions causing the processing unit to perform a method comprising:
identifying the presence of a protected term in a received domain-specific query based on the domain that is specific to the query, the domain that is specific to the query corresponding to a particular company, the domain having an associated company dialogue service, the protected term corresponding to a term inappropriate for use with a different dialogue service, the protected term being stored within a table along with information associated with the protected term, the information associated with the term comprising replace with information, domain information, source term information, owner information, reverse translate information, alternate term information and part of speech information; and substituting the identified protected term with its associated substitute term, the substituting using the information from the table to substitute the identified protection term with its associated substitute term.

* * * * *